(No Model.)
C. A. BEHLEN.
VEHICLE SPRING.
No. 534,190. Patented Feb. 12, 1895.
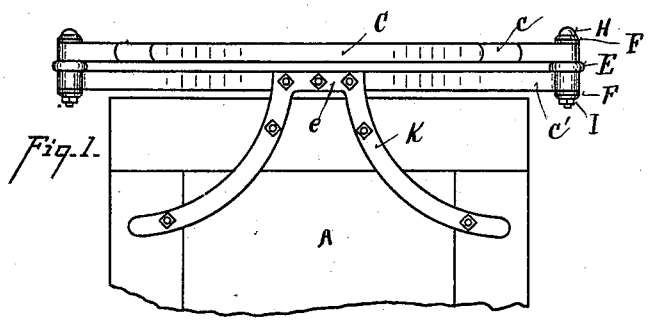
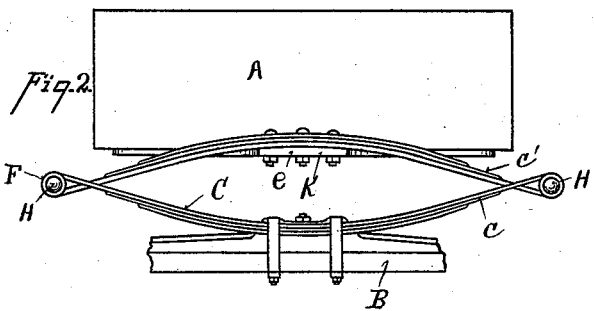
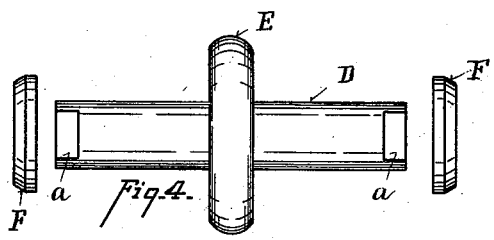
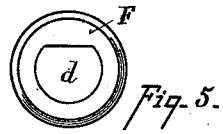
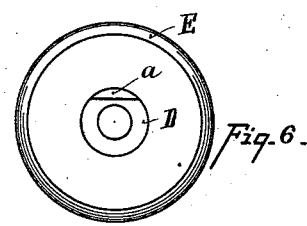
Witnesses
C. W. Miles
Oliver B. Kaiser
Inventor
Chas. A. Behlen.
By Wood & Boyd
Attorneys

UNITED STATES PATENT OFFICE.

CHARLES A. BEHLEN, OF CINCINNATI, OHIO.

VEHICLE-SPRING.

SPECIFICATION forming part of Letters Patent No. 534,190, dated February 12, 1895.

Application filed July 27, 1894. Serial No. 518,726. (No model.)

*To all whom it may concern:*

Be it known that I, CHARLES A. BEHLEN, a citizen of the United States, residing at Cincinnati, in the county of Hamilton and State of Ohio, have invented certain new and useful Improvements in Vehicle-Springs, of which the following is a specification.

The object of my invention is to construct a vehicle spring of two sections hinged at each end to a common axis and arranged so that each section will pass the other in operation, the parts being so constructed that they have little or no liability of wearing so as become loose and rattle.

The features of my invention are fully set forth in the accompanying drawings, forming a part of this specification, in which—

Figure 1, is a bottom plan view of a carriage body with the springs attached thereto. Fig. 2, is an end elevation of Fig. 1. Fig. 3, is a plan view of the coupling bolts. Fig. 4, is a plan view of the sleeve and collars. Fig. 5, is a plan view of the end collars. Fig. 6, is an end view of the sleeve and collars.

A represents a carriage body; B, the axle.

C represents the double spring formed of the sections $c$, $c'$. Each end of the spring is hinged to a common axis. This axis is constructed as follows: D represents a sleeve; E, a central collar formed integral with the sleeve. It is necessary to provide detachable end collars so as to allow the springs to be put on and taken off from the sleeve and to prevent the spring from coming in contact with the head and nut of the axial bolt. In order to clutch or couple the end collars to the sleeve so as to prevent them from rotating independently of the sleeve I employ the following construction: $a$ represents a segmental section cut off at each of the sleeves. F represents end collars which are provided with an orifice $d$ of the configuration corresponding in size and shape to the end section of the sleeve on which they fit and are clutched to the sleeve. H represents an axial bolt which passes through the sleeve and collars. I, represents the nut which clamps the collars F to the sleeve. By hinging the spring sections $c$, $c'$, side by side to the sleeve D, the body of the carriage can be attached directly to the spring and hung low down.

In order to obviate torsion, rattling, pitching, and rolling motion of the springs, and in order to sustain the carriage body in the proper position against uneven side weights, I provide the following instrumentalities:—

K represents a bifurcated bracket. E represents the knee of the same which is bolted to the upper spring section $c'$, the bifurcated arms extending forward in the same plane as the breast of the springs. The heels of said arms are bolted to the end sill of the body and the outward extended ends are each bolted to the respective side sills of the carriage body. This brings the springs close up to the body and effectually accomplishes the objects as above stated.

If the collars F were allowed to turn on the sleeve they would tend to loosen the nut permitting lost motion, and cause the parts to wear unduly.

It is essential to provide each spring with separate bearings and yet turn on a common axis but without contact with the head and nut of the bolt and this avoids the liability of loosening the parts and wear which causes them to rattle.

Having described my invention, what I claim, and desire to secure by Letters Patent, is—

1. The co-axial bearing for the spring C composed of the sleeve D, central collar E, and the detachable end collars F clutched to the sleeve D, substantially as specified.

2. The combination with the spring C of the coupling axis composed of the sleeve D, central collar E, detachable end collars F clutched to the sleeve by the axial bolt H and the nut I, substantially as specified.

3. As a new article of manufacture, an improved vehicle spring comprising the upper spring section $c'$ and body support K united thereto, and the lower spring section $c$, both sections being supported on the sleeve D and separated by the spacing collar E formed integral with the sleeve, the whole being clutched by the collars F, and bolt and nut H. I. substantially as shown and described.

In testimony whereof I have hereunto set my hand.

CHARLES A. BEHLEN.

Witnesses:
C. W. MILES,
E. E. WOOD.